US012798075B2

(12) United States Patent
Call

(10) Patent No.: US 12,798,075 B2
(45) Date of Patent: Nov. 17, 2026

(54) INDEXABLE TRIM TOOL

(71) Applicant: Snap-on Incorporated, Kenosha, WI (US)

(72) Inventor: George R.R. Call, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 416 days.

(21) Appl. No.: 18/195,145

(22) Filed: May 9, 2023

(65) Prior Publication Data

US 2024/0375262 A1 Nov. 14, 2024

(51) Int. Cl.
*B66F 15/00* (2006.01)
*B25C 11/00* (2006.01)
*B25G 3/38* (2006.01)

(52) U.S. Cl.
CPC ................ *B25G 3/38* (2013.01); *B25C 11/00* (2013.01)

(58) Field of Classification Search
CPC . B66T 15/00; B25C 11/00; B25G 3/38; B66F 15/00
See application file for complete search history.

(56) References Cited

U.S. PATENT DOCUMENTS 2,921,773 A 1/1960 Hoelzer
5,871,204 A 2/1999 Spirer
6,101,907 A 8/2000 McGovern et al.
6,247,386 B1 6/2001 Gummow
7,174,812 B1 * 2/2007 Chiang .................. B25B 13/44 81/125
7,415,911 B2 8/2008 Cole
7,520,199 B2 4/2009 Stawarski
7,591,208 B2 9/2009 Cole
7,628,382 B2 * 12/2009 Cole ...................... B25C 11/00 254/26 R
7,682,099 B2 * 3/2010 Cole ...................... B25G 1/06 81/58.3

(Continued)

FOREIGN PATENT DOCUMENTS

CN 112677087 A 4/2021
CN 218145746 U 12/2022

(Continued)

OTHER PUBLICATIONS

UK Intellectual Property Office, Examination Report issued in corresponding Application No. GB2405602.0, dated Oct. 18, 2024, 9 pp.

(Continued)

*Primary Examiner* — Lee D Wilson
(74) *Attorney, Agent, or Firm* — Taft, Stettinius & Hollister LLP

(57) ABSTRACT

An indexable automotive trim fastener removal/disconnection tool is disclosed. The tool may include a handle having a gripping portion, an indexable joint mechanism, and a head. The indexable joint mechanism may include an axially movable joint-pin and a bias member, such as an elastic or compressible spring, disposed in a transverse hole, having one or more balls. The head may include or define a splined tool head bore, wherein the joint-pin is axially inserted to couple head to handle. A prying surface or fulcrum disposed on the head may be sloped, curved, beveled, or otherwise shaped to facilitate insertion between automotive trim panels.

17 Claims, 4 Drawing Sheets

(56) References Cited

U.S. PATENT DOCUMENTS

| | | | | |
|---|---|---|---|---|
| 8,297,596 | B2 * | 10/2012 | Su | B66F 15/00 254/27 |
| 8,511,207 | B2 * | 8/2013 | Su | B25G 3/38 81/177.8 |
| 8,708,312 | B2 | 4/2014 | Stawarski | |
| 9,427,862 | B1 | 8/2016 | Durfee, Jr. | |
| 10,344,488 | B2 | 7/2019 | Bridges | |
| 10,793,410 | B2 * | 10/2020 | Liou | B65G 7/02 |
| 11,331,776 | B2 * | 5/2022 | Su | B25B 23/0028 |
| 11,614,120 | B2 * | 3/2023 | Liu | B62K 3/002 403/84 |
| 11,667,028 | B2 * | 6/2023 | Su | B25B 23/0021 81/489 |
| 2004/0134314 | A1 | 7/2004 | Cole | |
| 2007/0045599 | A1 * | 3/2007 | Bilyeu | B66F 15/00 254/25 |
| 2007/0062342 | A1 * | 3/2007 | Hsieh | B25G 1/043 81/177.2 |
| 2007/0158626 | A1 | 7/2007 | Chang | |
| 2008/0282845 | A1 | 11/2008 | Stawarski | |
| 2010/0207082 | A1 | 8/2010 | Liou | |
| 2010/0251858 | A1 | 10/2010 | Huang | |
| 2010/0314593 | A1 * | 12/2010 | Fan | A61P 35/00 254/25 |
| 2012/0102699 | A1 * | 5/2012 | Bruce | B25B 27/02 254/130 |
| 2013/0175486 | A1 * | 7/2013 | Stawarski | B66F 15/00 254/129 |
| 2013/0305887 | A1 * | 11/2013 | Lai | B25B 23/0028 81/177.8 |
| 2017/0051521 | A1 * | 2/2017 | Bridges | B25B 27/04 |
| 2017/0320199 | A1 | 11/2017 | Frye | |
| 2019/0084817 | A1 * | 3/2019 | Zhang | B25C 11/00 |
| 2021/0114188 | A1 | 4/2021 | Ross | |
| 2022/0203506 | A1 | 6/2022 | Herritz | |
| 2024/0375262 | A1 * | 11/2024 | Call | B25G 1/043 |

FOREIGN PATENT DOCUMENTS

| | | | |
|---|---|---|---|
| GB | 2590157 | A | 6/2021 |
| JP | 2001121435 | A | 5/2001 |
| TW | 201028259 | A | 8/2010 |
| TW | 201249604 | A | 12/2012 |
| TW | 201412476 | A | 4/2014 |
| TW | I729484 | B | 6/2021 |
| TW | I759910 | B | 4/2022 |
| WO | 2015167660 | A1 | 11/2015 |

OTHER PUBLICATIONS

"Indexing Head Body Clip Muller," Item #6646, SK Professional Tools, sktools.com, accessed on May 9, 2023, 5 pages. URL: https://sktools.com/products/indexing-head-body-clip-puller.

Taiwan Patent Office, First Office Action issued in corresponding Application No. 113117139, dated Dec. 17, 2024, 18 pp.

Australian Patent Office, Examination Report No. 1 issued in corresponding Application No. 2024202714, dated Mar. 18, 2025, 6 pp.

Taiwan Patent Office, Second Office Action issued in corresponding Application No. 113117139, dated Apr. 22, 2025, 6 pp.

UK Intellectual Property Office, Examination Report issued in corresponding Application No. GB2405602.0, dated Feb. 12, 2026, 8 pp.

Australian Patent Office, Examination Report No. 2 issued in corresponding Application No. 2024202714, dated Feb. 23, 2026, 3 pp.

CN Patent Office, Office Action in corresponding application No. 2024105549540, dated Aug. 18, 2026.

CA Patent Office, Office Action in corresponding application No. 3237403, dated Aug. 31, 2026.

* cited by examiner

INDEXABLE TRIM TOOL

TECHNICAL FIELD OF THE INVENTION

The present invention relates generally to an automotive trim removal or disconnection tool, and more specifically to an automotive trim and fastener removal or disconnection tool having an indexable joint and head.

BACKGROUND OF THE INVENTION

Automobiles and other vehicles rely on hidden fasteners to hold trim panels and other components to one another. Once installed, however, access to and removal or disconnection of such fasteners for maintenance, repair, or replacement is difficult and time consuming. Automotive plastic underbody panels, for example, often have several obstructions surrounding their fastener locations. These obstructions require users to possess a variety and multitude of different types of fastener removal tools that have different head-to-handle angles for each unique fastener removal/disconnection situation. In certain situations, the ideal head-to-handle angle required for fastener removal does not exist in a current product, and often, existing tools are used in a non-conforming manner.

Current fastener removal/disconnection tools have a fixed angle in relation to the handle and user grip. Additionally, existing tool solutions have a small fulcrum area that concentrates prying forces on a reactionary surface that presents a high potential for damage to that surface. Other similar tool solutions that use an indexing mechanism incorporate a threaded fastener or retaining ring to retain the necessary components in the handle. Many current solutions do not possess necessary low-profile fastener interface design. Current solutions are also not able to be positioned quickly and easily due to how freely the joint operates in an unlocked position.

SUMMARY OF THE INVENTION

The present invention relates broadly to a fastener removal/disconnection tool having a handle, head, and indexable joint adapted to orientate the fastener removal feature of the tool in an optimal orientation for the user. An indexable joint may couple a fastener removal/disconnection head to a tool handle. The indexable nature of the fastener removal/disconnection tool allows a user to possess a single tool that is capable of being used in a multitude of different situations and environments. The versatility of the present invention also allows a user to perform tasks more efficiently without requiring the use of multiple different types of tools. The joint-head construction of the present invention may also offer a wider fulcrum on which the tool abuts to better dissipate forces applied to the reactionary surface during use. Such a configuration may thus minimize concentrated point loads and reduce potential of damage of automotive trim pieces during fastener removal/disconnection.

According to an embodiment, a flex joint type tool is disclosed. The tool may include a handle having a distal end defining a handle bore and a proximal end. A tool head may define a head bore. A joint-pin may be axially disposed in the handle and head bores coupling the head to the handle. The joint-pin may be adapted to axially move relative to the handle bore between locked and unlocked positions, and coupled to the head bore. In the locked position, the angular orientation of the head relative to the handle may be fixed or locked, and when in the unlocked position, the angular orientation of the tool head relative to the handle can be adjusted.

According to another embodiment, an indexable tool may include a handle having distal and proximal ends. The distal end may have a handle splined bore. A tool head may include a tool head splined bore. A joint-pin may be axially disposed in the handle splined bore and the tool head splined bore. The joint-pin may include or define an external splined section disposed on a first portion of the joint-pin, and an unsplined or smooth section disposed on a second portion of the joint-pin. The tool head splined bore may be coupled to the external splined section. The joint-pin may be adapted to axially move between locked and unlocked positions relative to the handle splined bore. When the joint-pin is in the locked position, the external splined section meshingly engages the handle splined bore. When the joint-pin is in the unlocked position, the external splined section disengages the handle splines bore and the unsplined section is disposed adjacent to the handle splined bore, allowing the joint-pin to rotate relative to the handle splined bore.

According to another embodiment, an indexable joint mechanism adapted to couple a tool head having a tool head bore to a handle is disclosed. The indexable joint mechanism may include a joint-pin axially disposed in and coupled to a head bore. The joint-pin may include first and second portions. A transverse hole may be disposed between the first and second portions and a bias member may be disposed in the transverse hole. First and second balls may be respectively disposed at opposing ends of the bias member and adapted to be biased against a portion of the handle. When the joint-pin is disposed in a locked position, the first portion of the joint-pin may engage the handle bore thereby retaining an angular orientation of the tool head relative to the handle. When the joint-pin is disposed in an unlocked position, the first portion disengages the handle bore and the second portion is disposed adjacent to the handle bore to allow the tool head to rotate relative to the handle, allowing the tool head to rotate relative to the handle.

BRIEF DESCRIPTION OF THE DRAWINGS

For purposes of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1A:
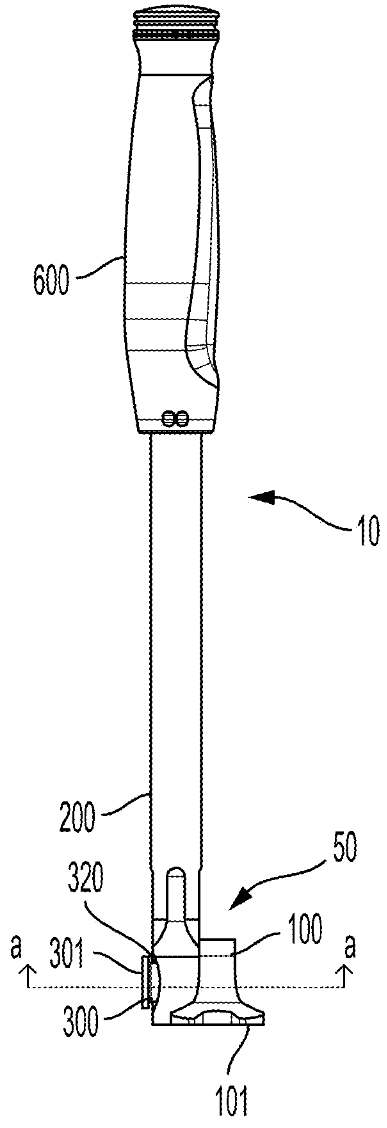
FIG. 1A is front view of an indexable trim fastener removal/disconnection tool, according to an embodiment of the present invention.
Figure 1B:
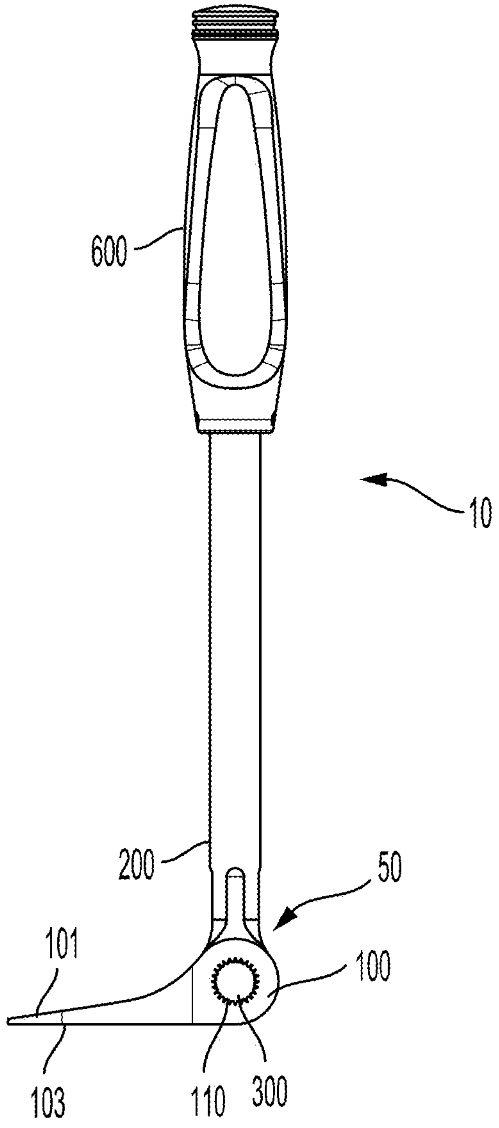
FIG. 1B is a side view of the indexable trim fastener removal/disconnection tool of FIG. 1A, according to an embodiment of the present invention.
Figure 2:
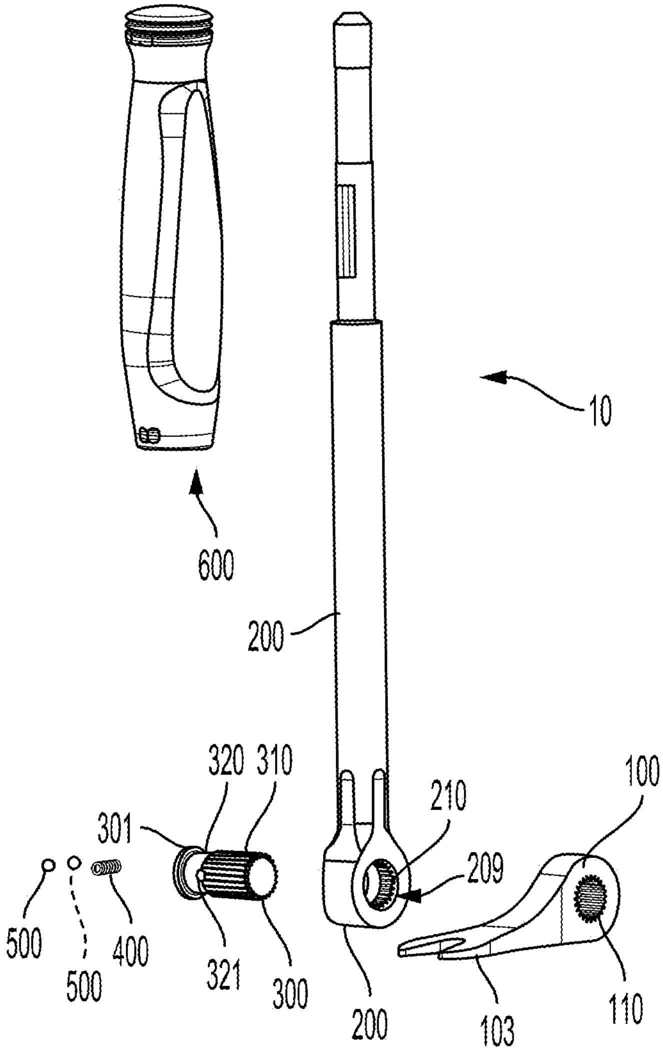
FIG. 2 is an exploded perspective view of the trim fastener removal/disconnection tool of FIG. 1A, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention but is instead used to discuss exemplary embodiments of the invention for explanatory purposes only.

The present invention relates broadly to an automotive trim fastener removal/disconnection tool. According to an embodiment, an indexable joint couples a fastener removal/disconnection head to a tool handle. The indexable nature of the fastener removal/disconnection tool allows a user to rely on one tool to use in a multitude of different situations and/or environments. The versatility of the present invention also allows a user to perform necessary tasks more efficiently without requiring the use and inventory of multiple different types of tools. In an embodiment, the joint-head construction of the present invention provides a wider fulcrum point for the tool to operate, thereby better dissipating forces applied to the reactionary surface during use to minimize concentrated point loads and reducing damage during use of the tool. In an embodiment, this may be accomplished by maintaining a substantially consistent or constant diameter on the handle head and the fastener interface where they meet, for example at a joint-pin described herein. The construction of the joint may also allow for simplified assembly during manufacturing and production.

The design and configuration of the indexable joint of the present invention incorporated in in a tool may allow for greater versatility in the fastener interface feature design, thus allowing the tool to be more slender and have a lower profile, compared to conventional automotive trim fastener removal/disconnection tools. When in an unlocked position, the tool head's angular orientation relative to the handle may be better aligned by a retention mechanism including, for example, a bias member and one or more balls that interact with a splined surface. Such a configuration may allow a user to utilize single hand operation to more easily orient the tool head to a desired position relative to the handle, and subsequently selectively lock the tool head-handle orientation into place.

Referring generally to FIGS. 1A-4C, an indexable automotive trim fastener removal/disconnection tool 10, according to an embodiment of the present invention, is shown. The tool 10 may include a handle 200 having a gripping portion, such as grip 600, an indexable joint mechanism 50, and a head 100 defining a fork, tongue or yoke. The indexable joint mechanism 50 may include, without limitation, an axially movable joint-pin 300 and a bias member 400, such as an elastic or compressible spring, disposed in a transverse hole, having one or more balls 500. The head 100 may include or define a splined tool head bore 110, wherein the joint-pin 300 is axially inserted to couple head 100 to handle 200. A prying surface or fulcrum disposed on the head 100 may be sloped, curved, beveled, or otherwise shaped to facilitate insertion between automotive trim panels. The head 100 may also provide a low-profile design that allows the tool to be oriented and stored in a manner that occupies reduced space.

The grip 600 may be integral with or otherwise coupled to a proximal end of the handle 200 by any number of known fixtures including, but not limited to, adhesives, tension screws, press fit, or the like. The grip 600 may include or define a gripping or other defined surfaces, suitable for a user to effectively and ergonomically grasp and maintain hold of the tool 10. The grip 600 may be made or formed from a plastic or polymeric material, rubber, metal, or a combination thereof. In an embodiment, a proximal end of the handle 200 may include or define an external geometry substantially matching an internal geometry of the grip 600, further providing a secure coupling of the grip 600 to the handle 200. The handle 200 of the tool 10 may include or define a handle bore 209 disposed at or near a distal end of the handle 200. According to an embodiment, the handle bore 209 may include a first internally splined bore portion 210 and a smooth or unsplined second portion 212.

The joint-pin 300 may include or define a splined section 310 about a first portion of the outer circumference of the joint-pin 300. The splined section 310 of the joint-pin 300 may be sized and shaped to axially move into and meshingly engage the splined portion 210 of the handle bore. For example, the splined bore portion 210 may include or define spline teeth having a cooperative width and depth as the corresponding splines of the joint-pin 300. The joint-pin 300 may also include or form a substantially unsplined or smooth section 320 about a second portion of the outer circumference of the joint-pin 300. The unsplined section 320 may have a diameter nominally less than the minimum diameter of the splined section 310 of the joint-pin 300, thereby allowing the joint-pin 300 to rotate relative to the splined bore portion 210 when the unsplined section 320 is disposed adjacent to the splined bore portion 201. In an embodiment, the unsplined section 320 may also include or define a transverse hole 321 that is adapted to receive a bias member 400, such as a spring, and one or more balls 500. The bias member 400 is adapted to bias the balls 500 outwardly.

It will be understood that the joint-pin 300 may be selectively axially moved through the splined bore portion 210 into either locked or unlocked positions relative to the splined bore portion 210, such that the spline portion 310 can selectively engage the splined bore portion 210. When the joint-pin 300 is axially disposed in the locked position, the splined section 310 of the joint-pin 300 engages the internal splined bore portion 210, thereby preventing the joint-pin 300 from rotating relative to the splined bore portion 210. When the joint-pin 300 is disposed is in the unlocked position, the unsplined section 320 is disposed adjacent to the splined bore portion 210, thereby allowing the joint-pin 300 to rotate relative to the splined bore portion 210. In an embodiment, the biasing member 400 is adapted to apply a bias force to the balls 500 in an outwardly, radial direction of the pin 300, such that the detent balls 500 are biased outwardly from an outer surface of the pin 300. The detent balls 500 cooperatively detain the pin 300 relative to the handle 200 in one of either the locked and unlocked positions, as described herein. Moreover, the detent balls 500 may provide a tactile indication to a user when either one of the locked and unlocked positions is selected.

The joint-pin 300 may also include or form a mush-roomed cap or radially-extending shoulder 301 having a diameter larger than the diameter of the splined bore portion 210, thereby preventing the joint-pin 300 from inadvertently being removed from the tool 10. The radially extending shoulder 301 may also be referred to as a head or flange portion. According to an embodiment, the splined portion 310 of the joint-pin 300 may be longer than the width of the splined bore portion 210 of the handle 200. The greater length of the splined portion 310 may be coupled to a pry tool head 100. The head 100, according to an embodiment, may include or form a splined tool head bore 110 having a substantially similar diameter and spline profile as the splined section 310 of the joint-pin 300. The secure fit of the spline portion 310 with the splined tool head bore 110 statically couples the two parts together, such that both the joint-pin 300 and the head 100 rotate together. The coupling of the joint-pin 300 to the head 100, according to a preferred embodiment, may be permanent and achieved by press fit, interference fit, a weld, a peen, or other bonding known to those skilled in the art.

Figure 3B:
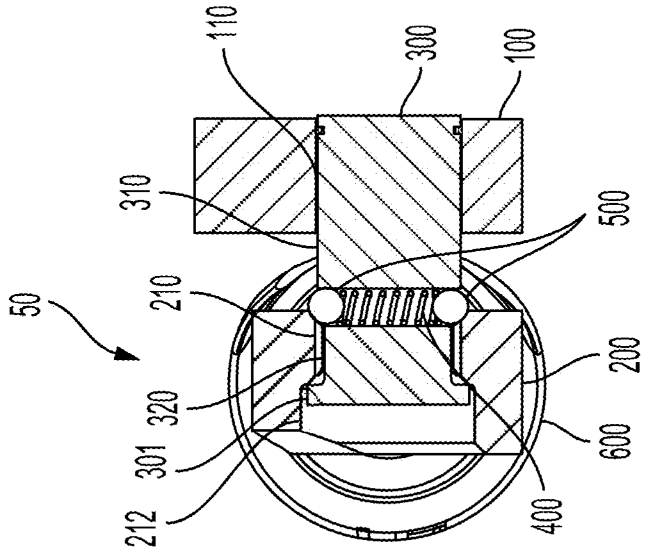
FIG. 3B is a sectional, bottom view of the trim fastener removal/disconnection tool of FIG. 1, taken across line a-a of FIG. 1, with the indexable joint-pin disposed in an unlocked position, according to an embodiment of the present invention.
Figure 3A:
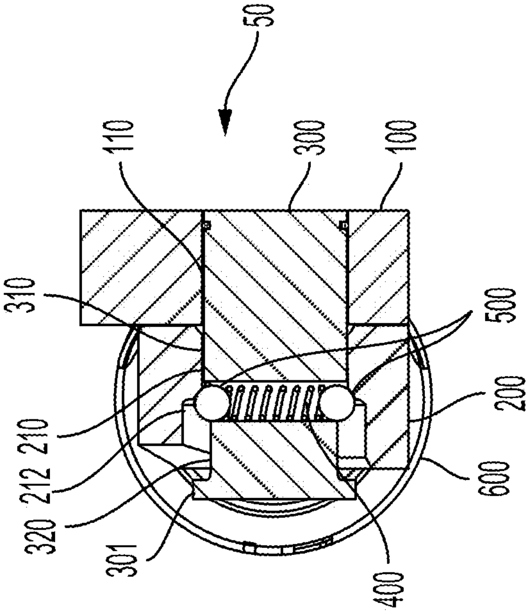
FIG. 3A is a sectional, bottom view of the trim fastener removal/disconnection tool of FIG. 1, taken across line a-a of FIG. 1, with the indexable joint-pin disposed in a locked position, according to an embodiment of the present invention.

As shown in FIG. 3A, the joint-pin 300 is disposed in the locked position wherein the splined section 310 securely and meshingly engages the internal splined bore portion 210, and the joint-pin 300 is further retained in the splined bore portion 210 of the handle 200 by the bias member 400 and two balls 500. The joint-pin 300 in the locked position effectively locks the orientation of the head 100 relative to the handle, as the head is fixedly coupled to the splined section 310 of the joint-pin 300. In the locked position, the balls 500 may be biased to engage the un-splined portion 212 of the handle bore 210.

As shown in FIG. 3B, the joint-pin 300 is disposed in the unlocked position, whereby the joint-pin 300 has been axially moved inwardly, compressing the bias member 400, such that the splined section 310 of the joint-pin 300 passes through the splined bore 210 and the unsplined section 320 of the joint-pin 300 is disposed adjacent to the splined section 210. In the unlocked position, the balls 500 in cooperative engagement with the shoulder 301 may be adapted to retain the joint-pin 300 in the unlocked position. The balls 500 and bias member 400 may return to their pre-compressed positions after passing through the splined bore portion 210 and partially retained by the outer edge of the splined bore 210. The shoulder 301 of the joint-pin 300, having a larger diameter than the splined bore 201, abuts a flange or chamfer between the unsplined bore portion 212 and the splined bore portion 210, preventing the joint-pin 300 from passing completely through the splined bore portion 210. The chamfer along with an appropriate bias force exerted by the biasing member 400 on the balls 500, assists in allowing axial movement of the pin 300 between the locked and unlocked positions relative to the handle 200.

In the unlocked position, the joint-pin 300 and head 100 may rotate freely due to the unsplined section 320 of the joint-pin 300 disposed adjacent to the splined bore 210. When the desired angular orientation of the head 100 relative to handle 200 is reached, the joint-pin 300 may then be axially actuated back to the locked position by pressing the head 100 with a force enough to compress the bias member 400 causing the balls 500 to pass through the splined bore portion 210 and return to their biased position against the second portion 212 of the bore.

Figure 4A:
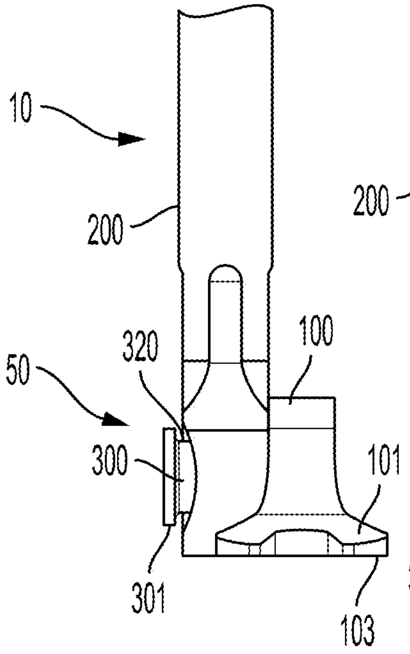
FIG. 4A is an enlarged side view of the head of the trim fastener removal/disconnection tool of FIG. 1, showing the joint-pint disposed in a locked position, according to an embodiment of the present invention.

When the joint-pin 300 is in the unlocked position, a user may selectively rotate the head 100 relative to the handle 200 to a desired angle or orientation. The orientation of the head 100 may be selected by the user to accommodate tight or awkward angles of automotive trim panels or other structures to be removed. As shown, for example, in FIGS. 4A-C, the head 100 may be selectively oriented in any angular position about the 360-degree rotation of the joint-pin 300. FIG. 4A depicts the tool 10 with the joint-pin 300 in the locked position. When in the locked position, the splined section 310 meshingly engages with the splined bore portion 210, effectively locking the position of the head 100, in this example, at about 90-degrees with respect to the handle 200.

Figure 4B:
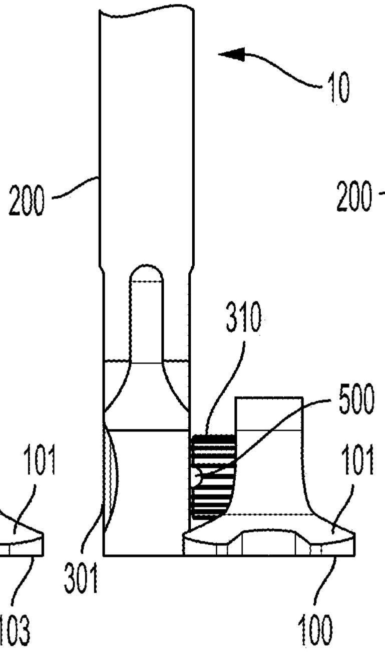
FIG. 4B is an enlarged side view of the head of the trim fastener removal/disconnection tool of FIG. 1, showing the joint-pint disposed in an unlocked position, according to an embodiment of the present invention.
Figure 4C:
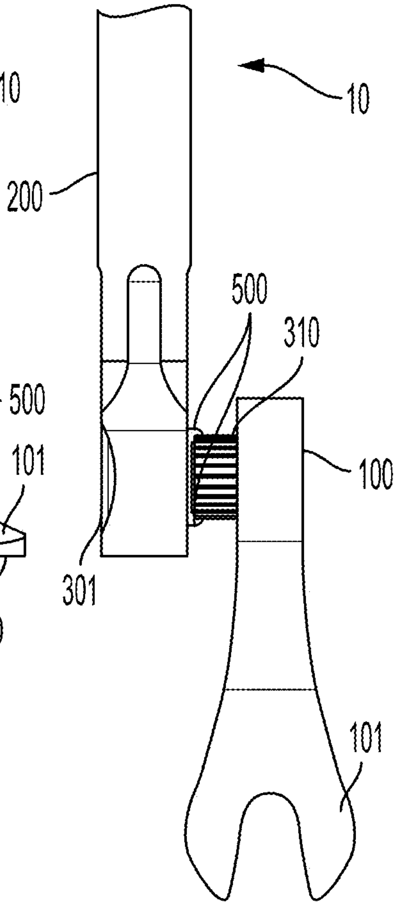
FIG. 4C is an enlarged side view of the head of the trim fastener removal/disconnection tool of FIG. 1, showing the joint-pint disposed in an unlocked position and the tool head being selected rotated to a desired orientation, according to an embodiment of the present invention.

FIG. 4B depicts the tool 10 with the joint-pin 300 in the unlocked position, whereby the joint-pin 300 has been axially moved to actuate the splined section 310 through and out of engagement with splined bore portion 210. In the unlocked position, the smooth section 320 of the joint-pin 300 is disposed in the splined bore adjacent to the splines of the splined bore, thus allowing rotation of the joint-pin 300 relative to the bore. As shown in FIG. 4C, the head 100 has been rotated, for example, another 90-degrees, placing the head 100 at an angle of about 180-degrees with respect to the handle 200. To lock the selective orientation of the head 100 with respect to the handle 200, the head 100, which is coupled to the joint-pin 300, may be pressed returning the splined section 310 of the joint-pin 300 into engagement with the splined bore portion 210. The user may then use the tool 10 in its selected orientation. The selective engagement of the joint-pin 300 in the locked position allows the tool 10 to provide the necessary leverage at the appropriate angle to release the fasteners from engagement.

In an embodiment, the tool head 100 may include or define a pry surface 103, such as a fork, yoke, or tongue. When the joint-pin 300 is in the locked position, selectively retaining the head 100 in a fixed orientation with respect to the handle 200, the tool 100 may be used to remove or disconnect automotive trim, for example, by inserting the pry surface 103 of the tool head 10 into a seam between trim panels or the surrounding structure. With the head 100 in a fixed orientation, the user may pull, press, or otherwise actuate the handle 200 as a lever, with the pry surface abutting the trim panel or surrounding structure. The lever action of the handle 200 may pry the trim panel away from the structure, releasing the fasteners. The pry surface may include a wide fulcrum point across the lateral width of the pry surface 103, such that the abutment surface area of the fulcrum and the reactionary surface (e.g., trim panel or surrounding surface) is increased, thus better dissipating the forces transferred via the fulcrum and minimizing damage to the reactionary surface during use.

Further, while the embodiments described herein describe a tool for use in removing/disconnecting fasteners securing automotive trim or panels, one skilled in the art will recognize that the described application is merely exemplary and the present invention may be used for a variety of applications in which a indexing tool head with the disclosed structure may be desired.

While the splined portion 310 of the joint-pin 300 and the complementary splines of handle bore 210 and head bore 110 provide an angular adjustment mechanism between the handle 200 and the head 100, it is to be understood that the invention is not limited to splined cross sections. For example, any polygonal cross-section could be used to perform the angular adjustment function.

As used herein, words denoting approximations of ranges, such as "generally," "substantially," and "about," are descriptive terms used to cover manufacturing tolerances. One of skill in the art would understand the disclosed and claimed dimensions and relationships do not have to be exact or precise, but some amount of tolerance (such as manufacturing and/or measuring tolerances) are within the scope of the claims and the invention.

As used herein, the term "coupled" and its functional equivalents are not intended to necessarily be limited to direct, mechanical coupling of two or more components. Instead, the term "coupled", and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

As used herein terms denoting direction, order, or orientation such as "first," "second," "horizontal," "vertical," "lateral," "top," "bottom," "left," "right," "over," "under," "above," "below," "front," back," or the like, are non-limiting and used herein for ease of explanation. One of skill in the art will recognize the use of these terms as merely descriptive examples that do not limit the placement, orientation, or disposition of the elements described using such terms.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool comprising:

a handle having distal and proximal ends, the distal end having a handle bore including a splined bore portion having a first diameter and an unsplined bore portion having a second diameter, wherein the second diameter is larger than the first diameter;

a head having a head bore; and a joint-pin axially disposed in the handle and head bores coupling the head to the handle, wherein the joint-pin includes joint-pin splined and unsplined portions, is fixed axially relative to the head, and is adapted to axially move relative to the handle bore between locked and unlocked positions;

wherein when the joint-pin is disposed in the locked position, the joint-pin splined portion is engaged with the splined bore portion and an angular orientation of the head relative to the handle is fixed, and when the joint-pin is disposed in the unlocked position, the joint-pin splined portion is disengaged from the splined bore portion and the joint-pin unsplined portion is disposed adjacent to the splined bore portion, and the angular orientation of the head relative to the handle is adjustable.

2. The tool of claim 1, further comprising a bias member disposed in a transverse hole disposed in the joint-pin, wherein the bias member is adapted to outwardly bias first and second balls respectively disposed on opposing ends of the bias member.

3. The tool of claim 2, wherein the head bore includes a head bore internal splines portion, wherein at least a portion of the joint-pin splined portion is coupled to the head bore internal spline portion.

4. The tool of claim 3, wherein the head bore internal splined portion is coupled to the joint-pin spline portion by press-fit.

5. The tool of claim 1, wherein the tool head includes a fork.

6. The tool of claim 1, further comprising a grip portion coupled to the proximal end of the handle.

7. An indexable tool comprising:

a handle having distal and proximal ends, the distal end having a handle splined bore portion having a first diameter and an unsplined bore portion having a second diameter, wherein the second diameter is larger than the first diameter;

a tool head having a tool head splined bore; and a joint-pin axially disposed in the handle splined bore portion and the tool head splined bore and fixed axially relative to the tool head, the joint-pin including:

an external splined section disposed on a first portion of the joint-pin; and an unsplined section disposed on a second portion of the joint-pin, wherein the tool head splined bore is coupled to the external splined section;

wherein the joint-pin is adapted to axially move relative to the handle between locked and unlocked positions, wherein when the joint-pin is disposed in the locked position, the external splined section meshingly engages the handle splined bore portion, and when the joint-pin is disposed in the unlocked position, the external splined section disengages the handle splined bore portion and the unsplined section is disposed adjacent to the handle splined bore portion.

8. The indexable tool of claim 7, wherein the tool head splined bore is press-fit to a portion of the external splined section.

9. The indexable tool of claim 7, further comprising a retention mechanism adapted to selectively retain the joint-pin in one of the locked and unlocked positions.

10. The indexable tool of claim 9, wherein the retention mechanism includes:

a bias member disposed in a transverse hole disposed in the joint-pin; and first and second balls respectively disposed at opposing ends of the bias member;

wherein the bias member biases the first and second balls to engage the handle.

11. The indexable tool of claim 10, wherein the joint-pin is axially moved from the locked position to the unlocked position by overcoming the first and second balls engagement with the handle.

12. The indexable tool of claim 7, wherein the tool head includes a fork.

13. The indexable tool of claim 7, wherein the joint-pin includes a shoulder having a diameter that is greater than a diameter of the external splined section.

14. The indexable tool of claim 7, further comprising a grip coupled to the proximal end of the handle.

15. The indexable tool of claim 14, wherein the grip includes a gripping portion.

16. An indexing joint mechanism adapted to couple a tool head having a tool head bore to a handle including a handle bore including a splined bore portion having a first diameter and an unsplined bore portion extending from the splined bore portion and having a second diameter, wherein the second diameter is larger than the first diameter, the indexing joint mechanism comprising:

a joint-pin axially disposed in and coupled to a head bore, wherein the joint-pin is adapted to axially move between locked and unlocked positions, the joint-pin including:

first and second portions, wherein the first portion includes a splined surface and the second portion includes an unsplined surface;

a transverse hole disposed between the first and second portions;

a bias member disposed in the transverse hole; and first and second balls respectively disposed at opposing ends of the bias member and adapted to be biased against a portion of the handle;

wherein when the joint-pin is disposed in the locked position, the first portion of the joint-pin engages the splined bore portion, thereby retaining an angular orientation of the tool head relative to the handle, and when the joint-pin is disposed in the unlocked position, the first portion disengages the splined bore portion and the second portion is disposed adjacent to the splined bore portion to allow the tool head to rotate relative to the handle.

17. The indexing joint mechanism of claim 16, wherein the first portion of the joint-pin includes a splined surface, the second portion of the joint-pin includes an unsplined portion, wherein when the joint-pin is disposed in the locked position, the splined surface meshingly engages the splined bore portion, and when the joint-pin is disposed in the unlocked position, the splined surface disengages the splined bore portion and the unsplined portion is disposed adjacent to the splined bore portion.

* * * * *